(12) United States Patent
Sasaki et al.

(10) Patent No.: US 6,954,637 B2
(45) Date of Patent: Oct. 11, 2005

(54) WIRELESS BASE STATION AND METHOD FOR MAINTAINING SAME

(75) Inventors: Masayuki Sasaki, Tokyo (JP); Shinji Ohnishi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 705 days.

(21) Appl. No.: 09/969,667

(22) Filed: Oct. 4, 2001

(65) Prior Publication Data

US 2002/0115434 A1 Aug. 22, 2002

(30) Foreign Application Priority Data

Feb. 22, 2001 (JP) ....................................... 2001-046226

(51) Int. Cl.[7] .............................................. H04Q 7/20
(52) U.S. Cl. ..................................... 455/423; 455/424
(58) Field of Search ................................. 455/423, 424, 455/425, 426.1, 9, 10; 379/9.02, 9, 29.01, 32.01, 29.1, 9.01

(56) References Cited

U.S. PATENT DOCUMENTS

| | | | | |
|---|---|---|---|---|
| 5,361,402 A | * | 11/1994 | Grube et al. | 455/67.11 |
| 5,654,901 A | | 8/1997 | Boman | 395/712 |
| 6,085,089 A | * | 7/2000 | Emmer et al. | 455/439 |
| 6,094,577 A | * | 7/2000 | Han | 455/424 |
| 6,108,536 A | * | 8/2000 | Yafuso et al. | 455/424 |
| 6,112,081 A | * | 8/2000 | Namura et al. | 455/424 |
| 6,289,216 B1 | * | 9/2001 | Koh et al. | 455/424 |
| 6,389,282 B1 | * | 5/2002 | Hirsch | 455/423 |
| 6,662,008 B1 | * | 12/2003 | Dolan et al. | 455/423 |
| 2002/0086677 A1 | * | 7/2002 | Hildebrand | 455/446 |
| 2002/0119773 A1 | * | 8/2002 | Niemela | 455/423 |

FOREIGN PATENT DOCUMENTS

| | | |
|---|---|---|
| DE | 19720594 | 1/1999 |
| EP | 0967817 | 12/1999 |
| WO | WO 01/93615 A1 | 12/2001 |

OTHER PUBLICATIONS

Varin J. et al., "Alcatel 900 A Paneuropean Cellular Radio-telephone System"; Commutation & Transmission (1992), vol. 14, No. 1, Paris, France; pp. 21–28.

* cited by examiner

*Primary Examiner*—Rexford Barnie
(74) *Attorney, Agent, or Firm*—Bacon & Thomas, PLLC

(57) ABSTRACT

Maintenance of a wireless base station can be easily performed even when a wireless base station is installed on an electric pole. A maintenance terminal for communicating with a maintenance unit in the wireless base station through a wireless link is prepared for the wireless base station. The maintenance unit receives maintenance information and transmits the maintenance information received to the maintenance terminal, which is monitored by an operator. Also, the maintenance unit receives a control data from the maintenance terminal and controls a circuit operation of the wireless base station.

8 Claims, 5 Drawing Sheets

WIRELESS BASE STATION AND METHOD FOR MAINTAINING SAME

FIELD OF THE INVENTION

The present invention relates to a wireless base station in a mobile wireless system and a method for maintaining same.

DESCRIPTION OF THE PRIOR ART

Figure 2:
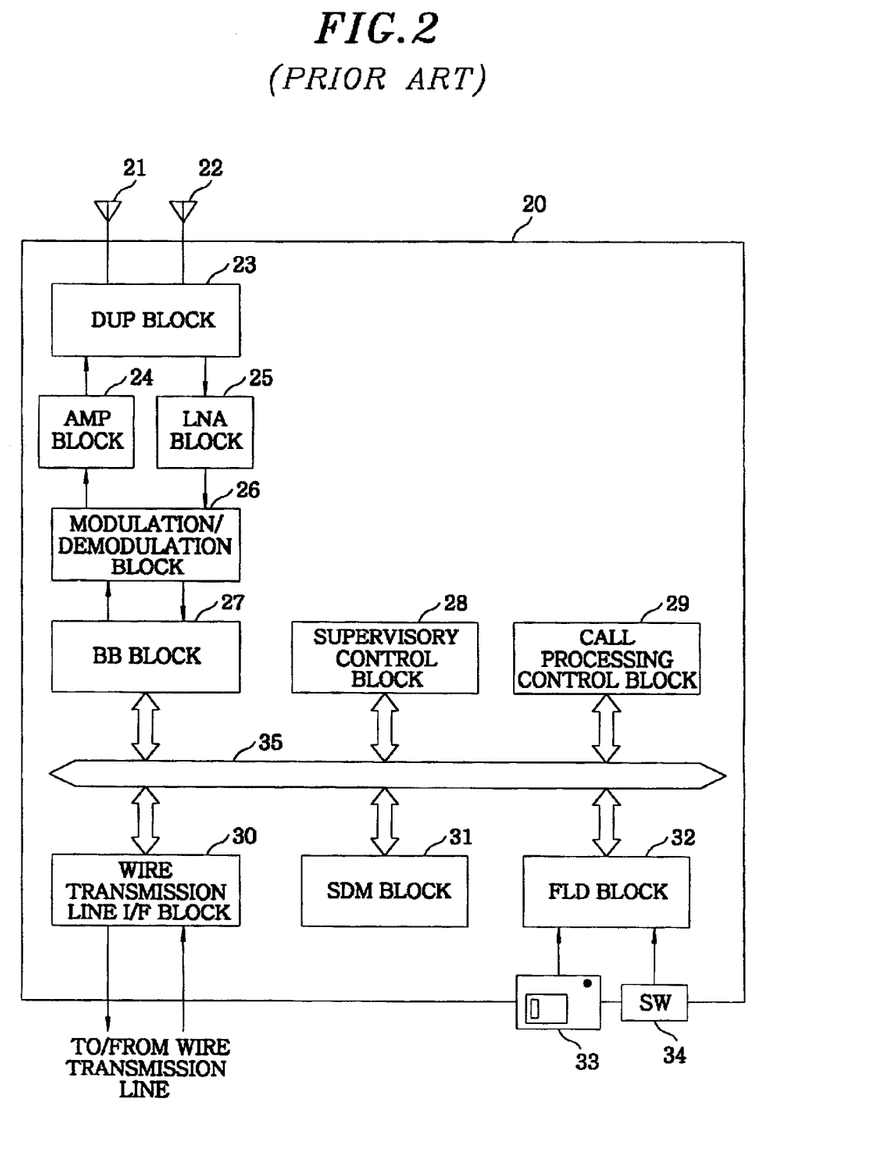
FIG. 2 describes a functional block diagram of a conventional wireless base station.

Referring to FIG. 2, there is shown a functional block diagram of a conventional wireless base station 20. A radio wave received by a reception antenna 22 is transmitted to a low noise amplification (LNA) block 25 via a duplexer (DUP) block 23. The LNA block 25 amplifies the received radio wave and transmits the amplified radio wave to a modulation/demodulation (MODEM) block 26, which converts the amplified radio wave into a baseband signal to transmit same to a baseband processing (BB) block 27. The BB block 27 performs an error correction and a deframing of the baseband signal, demodulates data of the baseband signal and then transmits the demodulated data to an interface 35. The interface 35 delivers the demodulated data to a wire transmission line interface (I/F) block 30 that sends the demodulated data to a wire transmission line.

Meanwhile, a signal inputted from the wire transmission line is delivered to the BB block 27 via the interface 35 and the wire transmission line I/F block 30. The BB block 27 performs the error correction and framing of the input signal, modulates data of the input signal and transmits the modulated data to the MODEM block 26. The MODEM block 26 converts the modulated data into a quadrature modulated radio frequency signal and transmits same to an amplification (AMP) block 24. The AMP block 24 amplifies a power of the modulated radio frequency signal up to a predetermined level and then a transmission antenna 21 transmits the amplified radio frequency signal.

A supervisory control block 28 monitors a state of the wireless base station 20 and a call processing control block 29 takes charge of the management, the establishment and the release of a wireless line. A system data memory (SDM) block 31 is a memory for storing program or data file required by the wireless base station 20 and a file load (FLD) block 32 locally performs an operation of file in a memory medium section 33 where a program or a data file required by the wireless base station 20 is stored. The memory medium section 33 uses, e.g., a PC card as a memory medium, and a switch (SW) section 34 serves to select the data file to be loaded from the memory medium section 33. The interface 35, which is implemented with, e.g., PCI/VME bus, ATM, LAN or the like, interfaces each functional block of the wireless base station 20.

Figure 3:
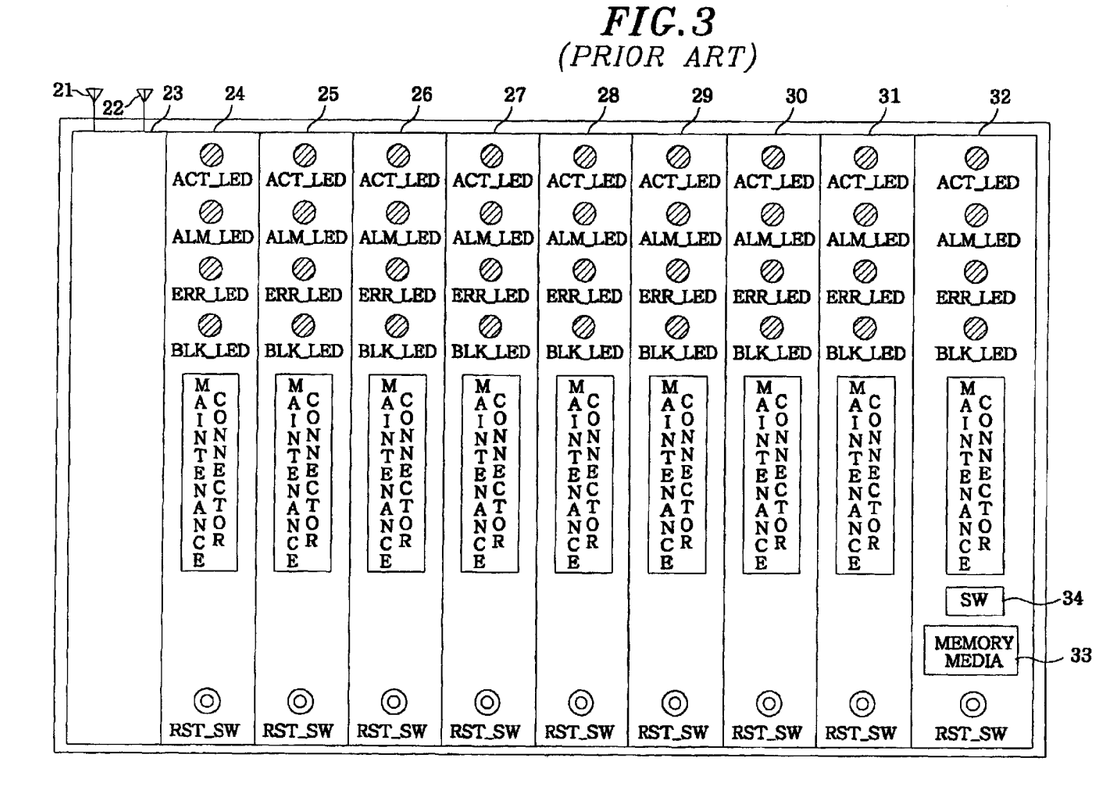
FIG. 3 represents a schematic view of a housing body of the conventional wireless base station shown in FIG. 2.

The wireless base station 20 is constituted of a housing body incorporating a plurality of circuit boards or cards received in its slots, each of the boards having thereon one of the functional blocks shown in FIG. 2. FIG. 3 illustrates a schematic view of the housing body incorporating therein the boards. As exemplified in FIG. 3, each board is arranged in the order of the DUP block 23, the AMP block 24, the LNA block 25, the modulation/demodulation block 26, the BB block 27, the supervisory control block 28, the call processing control block 29, the wire transmission line I/F block 30, the SDM block 31 and the FLD block 32, wherein the board of the FLD block 32 has the SW section 34 and the memory media section 33 therein.

Each board has light emission diode (LED) ramps for presenting the state of a corresponding functional block, a maintenance connector for repairing and debugging the corresponding functional block, and a reset switch (RST_SW) on its front panel. In the drawing, there are exemplified the state presentation ramps such as an ACT_LED, an ALM_LED, an ERR_LED and a BLK_LED, wherein the ACT_LED lights up when the corresponding functional block operates normally, the ALM_LED lights up in case where an operation error or failure occurs in the corresponding functional block, the ERR_LED lights up in case where a communication error occurs between the corresponding functional block and another functional block, and the BLK_LED lights up in case where the corresponding block is blocked. Since a maintenance work is performed on the board-by-board basis allotted for a specific functional block shown in FIG. 2, it is desirable to provide a board serving as a maintenance unit with LEDs, a maintenance connector and a reset switch for presenting a state and resetting an operation of the corresponding functional part.

In order to maintain such a conventional wireless base station 20 with the aforementioned hardware architecture, the maintenance personnel has to directly inspect the wireless base station 20. For instance, the maintenance personnel should come to the housing body of the wireless base station 20 and look into the state presentation ramps on each board of the housing body to find out whether or not an error occurred in a functional block. If the LEDs indicate that an error has occurred in a functional block, data communications to and from the fault functional block has to be carried out for the maintenance thereof through the corresponding maintenance connector, when necessary.

Further, when replacing a program or system data required by the wireless base station 20, the requested program or data has to be loaded by inserting a memory medium into the memory medium section 33 and manipulating the SW section 34.

As mobile communications have become ever more popular, the required number of wireless base stations has also been increased in proportion thereto. Accordingly, the size of a wireless base station needs to be scaled down in order to facilitate the acquisition of the installation site of the wireless base stations. Further, because an ultra-small capacity wireless base station serving, e.g., only dozens of communications channels sometimes needs to be installed on a utility pole such as a telephone or an electric pole, it has also become important to develop a scheme capable of facilitating the manipulation and maintenance of the wireless base station.

For the maintenance of a wireless base station, the state of each functional block serving as a maintenance unit shown in FIG. 2 has to be identified. Therefore, a functional part is mounted in one board, which is provided with the state presentation ramps, the maintenance connector and the reset switch thereon as described above. In such a case, since one board is occupied by one and only functional block regardless of its functional capacity, the surface of each board may not be fully utilized, leaving some unoccupied space therein; and thus such architecture is not suitable for the miniaturization of the wireless base station. Further, since the maintenance personnel has to reach each board in person for the maintenance thereof, the installation of the wireless base station on a utility pole would cause the maintenance problem. Therefore, there has been required to develop a method capable of maintaining a wireless base station from a remote place.

To address the problem stated above, architectures of a remote monitor by which a remote supervision and a restoration of a wireless base station are conducted is disclosed in the Japanese Laid-Open Publication No. 1998-84413 entitled as "REMOTE MONITOR". This prior art technique relates to a method for allocating one of the communications channels assigned to the wireless base station as monitoring channel serving as a line for remotely controlling the wireless base station. Accordingly, the maintenance of the wireless base station can be performed without having to gain a direct access thereto, e.g., by climbing up an electric pole. However, the prior art technique has a drawback in that a part of the communications channels has to be consumed for the maintenance of the wireless base station. Also, when there occurs a problem in the communication function of the wireless base station, the maintenance work simply cannot be achieved due to the failure of the base station itself which has to be fixed by the maintenance function of the remote monitor.

SUMMARY OF THE INVENTION

It is, therefore, an object of the present invention to provide a miniaturized wireless base station capable of being remotely maintained without having to gain a direct access thereto, and a method for remotely maintaining same.

In accordance with one aspect of the present invention, there is provided a wireless base station of a mobile wireless system, including:

a maintenance unit for collecting information on an internal state of the wireless base station as a maintenance information, converting the maintenance information into a radio signal, transmitting the radio signal through a wireless link, and controlling an internal circuit of the wireless base station under a control of a control signal obtained from a signal received through the wireless link.

In accordance with another aspect of the present invention, there is provided a method for maintaining a wireless base station, including the step of:

preparing a maintenance terminal for communicating with a maintenance unit in the wireless base station through a wireless link;

wherein the maintenance terminal receives a maintenance information transmitted from the maintenance unit and displays the maintenance information on a basis of a maintenance unit of internal circuit of the wireless base station.

In accordance with still another aspect of the present invention, there is provided a method for maintaining a wireless base station, including the step of:

preparing a maintenance terminal for communicating with a maintenance unit in the wireless base station through a wireless link;

wherein the maintenance terminal transmits control information for maintaining the wireless base station.

BRIEF DESCRIPTION OF THE DRAWINGS

The objects and features of the present invention will become apparent from the following description of preferred embodiments given in conjunction with the accompanying drawings, in which.

DESCRIPTION OF THE PRESENT INVENTION

Figure 1:
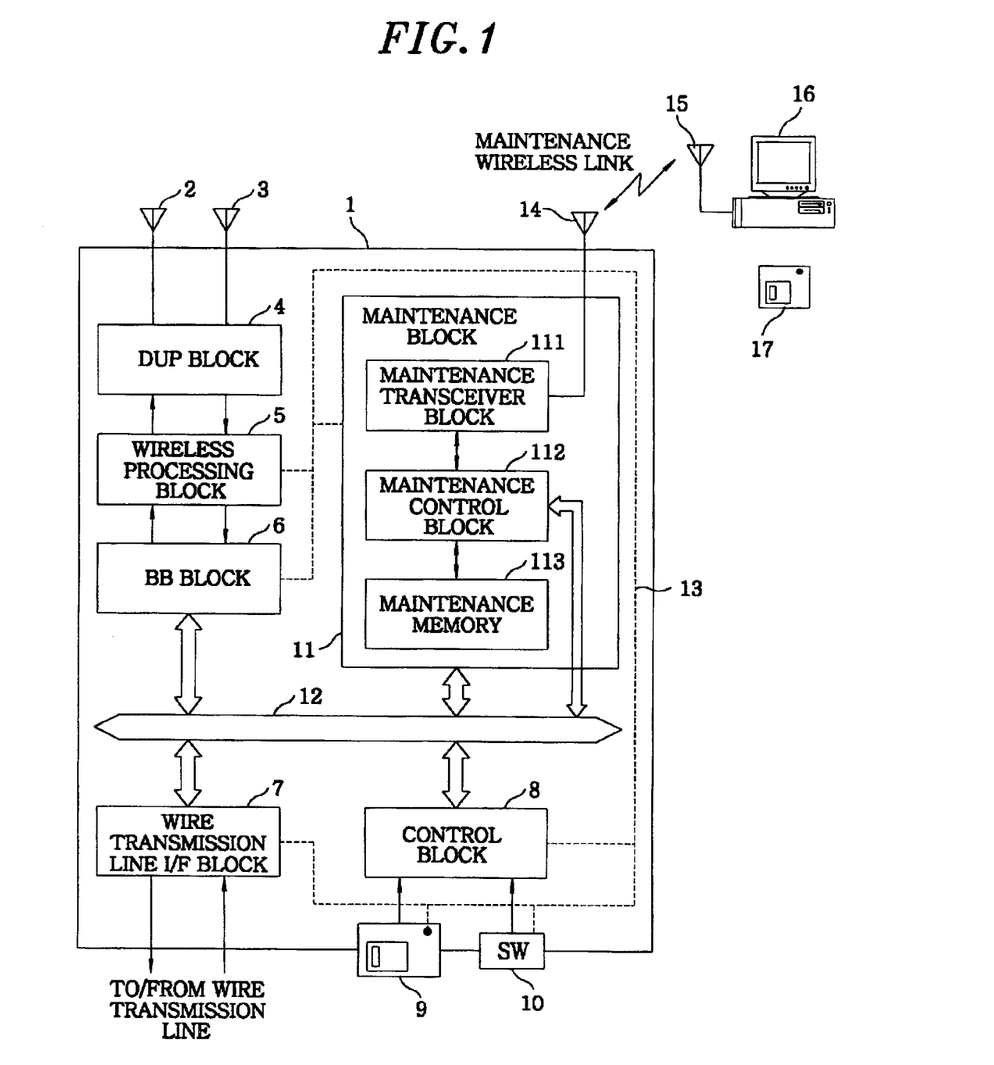
FIG. 1 shows a block diagram of a wireless base station in accordance with a preferred embodiment of the present invention.

Referring to FIG. 1, there is shown a block diagram for illustrating a wireless base station 1 in accordance with a preferred embodiment of the present invention, wherein a duplexer (DUP) 4 is connected to a transmission antenna 2, a reception antenna 3 and a wireless processing block 5.

The wireless processing block 5 incorporates therein parts corresponding to the amplification (AMP) block 24, the low noise amplification (LNA) block 25 and the modulation/demodulation (MODEM) block 26 shown in FIG. 2. The wireless processing block 5 converts a signal provided from the baseband processing (BB) block 6 into a quadrature modulated signal. The modulated signal is transmitted from the transmission antenna 2 via the DUP block 4. The wireless processing block 5 also demodulates a wireless frequency signal received by the reception antenna 3 and provided through the DUP block 4.

The baseband processing block 6 performs an error correction encoding, a framing and a data modulation of a transmission signal; and an error correction decoding, a deframing and a data demodulation of the received signal from the wireless processing block 5.

An interface 12, which is implemented with, e.g., PCI/VME bus, ATM, LAN or the like, is an interface for blocks of the wireless base station 1. A wire transmission line I/F block 7 similarly acts as the wire transmission line I/F block 30 of FIG. 2 and functions as an interface with the wire transmission line.

A control block 8 is an integrated block having therein the supervisory control block 28, the call processing control block 29, the system data memory (SDM) block 31 and the file load (FLD) block 32 shown in FIG. 2. The control block 8 monitors the state of the wireless base station 1, carries out a management, an establishment and a release of a wireless line and controls the system data memory, which stores a program and a data file of the wireless base station 1, and file loading from a memory medium.

A memory medium section 9 and a switch (SW) section 10 similarly act as the memory medium section 33 and the SW section 34 shown in FIG. 2, respectively. The memory medium section 9 serves to locally load the program or the data file of the wireless base station 1 from the memory medium. A PC memory or the like can be used as the memory medium. The switch section 10 locally controls the loading of programs or data files from the memory medium section 9.

The wireless base station 1 communicates with a maintenance terminal 16 by way of a maintenance block 11. The maintenance block 11, which includes a maintenance transceiver part 111, a maintenance control part 112 and a maintenance memory 113, is connected to a maintenance antenna 14, thereby transmitting maintenance information representing states of the functional blocks of the wireless base station 1 to the maintenance terminal 16 and receiving maintenance control information therefrom. The maintenance terminal 16 includes a maintenance terminal antenna 15 and a wireless transceiver part (not shown). The maintenance block 11 and the maintenance terminal 16 form a wireless link between the maintenance antenna 14 and the maintenance terminal antenna 15. Such wireless link can be implemented by using, e.g., the Bluetooth.

The maintenance control part 112 of the maintenance block 11 is connected to other parts of the wireless base station 1 through a control line 13 so as to receive and monitor the states of the functional blocks and transmit to a functional block a control signal for enabling, e.g., the resetting or the blocking thereof when necessary.

The maintenance terminal 16 displays the states of the functional blocks of the wireless base station 1 on a display screen thereof and provides, if necessary, the maintenance block 11 with a control signal for instructing, e.g., resetting or blocking a certain functional block or downloading a software.

The interface 12 is connected to the baseband processing block 6, the wire transmission line I/F block 7, the control block 8 and the maintenance block 11, thereby enabling the data communications therebetween.

Each of the DUP block 4, the wireless processing block 5, the baseband processing block 6, the wire transmission line I/F block 7 and the control block 8 corresponds to one hardware board of the wireless base station 1. That is, three boards of the AMP block 24, the LNA block 25 and the modulation/demodulation block 26 in the prior art wireless base station 20 shown in FIGS. 2 and 3 are integrated into one board of the wireless processing part 5 in accordance with the present invention, which facilitates the scale-down of the wireless base station 1.

Also, the control block 8 is a block that integrates four conventional boards of the supervisory control block 28, the call processing control block 29, the SDM block 31 and the FLD block 32 into one board.

In addition, the boards of the present invention are made not to include any of such parts required for maintenance in the prior art, e.g., LEDs, a connector and a reset switch provided on each board in the conventional wireless base station 20. Therefore, by removing such maintenance parts from the boards, the size of the boards of the present invention can be made smaller than that of the conventional board, which further facilitates the miniaturization of the wireless base station.

In FIG. 1, the wireless base station 1 of the present invention has been described to include the memory medium section 9 and the switch section 10. However, the memory medium section 9 and the switch section 10 may be removed from the wireless base station 1 and the maintenance terminal 16 can be configured to perform their operations on behalf of them. In such a case, the program or the system data which used to be stored in a memory medium used in connection with the memory medium section 9 of the prior art can be stored in a memory medium 17 (for example, if the maintenance terminal 16 is a personal computer, a CD or a FD can be used as the memory medium 17) used by the maintenance terminal 16. Then, the memory medium 17 is inserted into the maintenance terminal 16 and the data of the memory medium 17 is loaded to the maintenance memory 113 of the maintenance block 11 via the maintenance wireless link. Such architecture helps the wireless base station 1 to be further miniaturized.

The data indicating the state detected at each part of the wireless base station 1, i.e., the maintenance information, is collected by the maintenance control part 112 via the control line 13 and then stored in the maintenance memory 113. The maintenance information is transmitted through the wireless link and received by the maintenance terminal 16.

The maintenance information includes, for example, a bit error rate (BER) for representing a quality of service (QoS), such as a quality of a voice data service or a quality of data communications, a desired wave level and an interference wave level of a wireless channel, a signal to noise power ratio, a code domain power and the like.

The maintenance information may also include fault indication data identifying, for example, abnormalities in power and temperature, a synthesizer malfunction, an output overshoot, an automatic gain control (AGC) error and a sequential access method (SAM) error of a non-volatile memory.

Upon receiving the maintenance information, the maintenance terminal 16 displays, e.g., the BER or a warning message indicating the warning state, or sounds an alarm when necessary. The maintenance terminal 16 transmits the maintenance control information to the maintenance block 11 through the wireless link and the maintenance block 11 stores the received maintenance control information in the maintenance memory 113. The maintenance control part 112 controls parts of the wireless base station 1 based on the maintenance control information stored in the maintenance memory 113. The maintenance control information includes, e.g., an update control signal for updating system parameters for controlling a gain of the LNA part of the wireless processing block 5 and the like, and a monitoring request signal requesting the monitoring of internal state parameters, and so on.

The maintenance terminal 16 recognizes whether or not there is an error in a certain part of the wireless base station 1 by the help of the maintenance information provided from the maintenance block 11. If a certain part of the wireless base station 1 is determined to be erroneous, the corresponding part is first reset so as to restore the part into its normal state. Such a resetting operation can be performed manually by an operator of the maintenance terminal 16, e.g., by the operator's manipulation of a mouse or a keyboard of the maintenance terminal 16 in response to the maintenance information displayed thereon.

The control operation can also be carried out automatically under a control of a control software of the maintenance terminal 16, which is configured to automatically generate and transmit the maintenance control information to the wireless base station 1. In detail, upon receipt of the maintenance information indicating a fault or erroneous state, the maintenance terminal 16 identifies a board and further a functional block therein serving as a maintenance unit in which the error occurred, and transmits a reset signal for the identified functional block as the maintenance control information to the maintenance block 11 of the wireless base station 1. At the same time, the control software resets the maintenance terminal 16 itself by means of, e.g., a watchdog timer.

The preferred embodiment of the present invention has been described under the assumption that collecting the maintenance information and transmitting the maintenance control information from and to each part are carried out through the control line 13. Since, however, the maintenance block 11 in accordance with the present invention is also connected to the baseband processing block 6, a wire transmission line I/F block 7 and the control block 8 by means of the interface 12, the maintenance block 11 can collect the maintenance information and transmit the maintenance control information from and to the corresponding parts via the interface 12 without using the control line 13.

Figure 4:
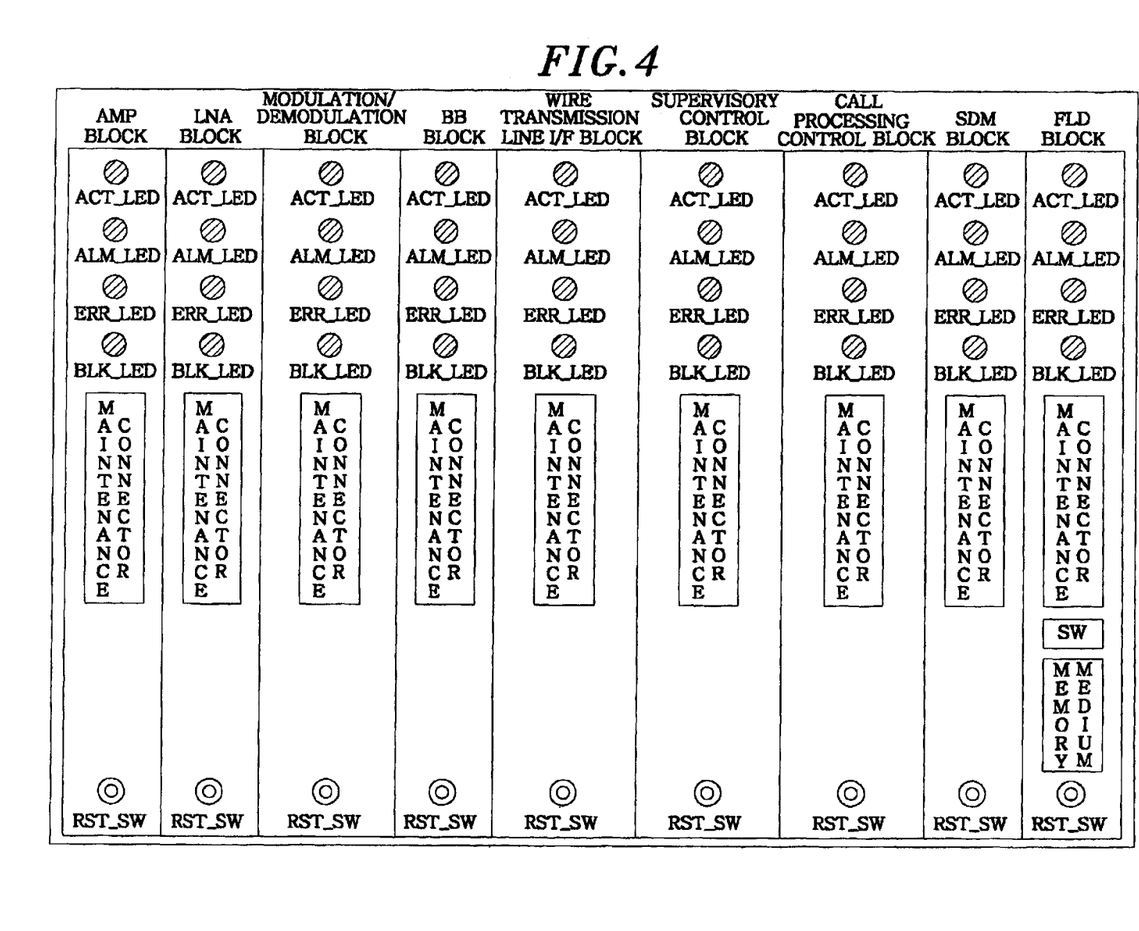
FIG. 4 exemplifies a presentation screen of a maintenance terminal of the present invention.

FIG. 4 exemplifies a display image on a screen of the maintenance terminal 16. The maintenance information transmitted from the maintenance block 11 is received by the maintenance antenna 15 and is piled up in the maintenance terminal 16. The maintenance information is displayed on the screen of the maintenance terminal 16 under the control of the control software of the maintenance terminal 16 and such display image can be deliberately altered and modified by manipulating the control software.

The exemplary display image shown in FIG. 4 is the one representing the maintenance information on the basis of maintenance units, which is different from the board arrangement of the wireless base station 1. The display image shown in FIG. 4 is a close replica resembling the board arrangement of the conventional wireless base station 20 shown in FIG. 3 in order to keep the similarity with the conventional maintenance work. That is, the display image shown in FIG. 4 replicates the board image of the conventional base station 20 shown in FIG. 3 and identifies the boards by displaying on top thereof corresponding names of the functional blocks of AMP block, LNA block, modulation/demodulation block, baseband processing (BB) block, wire transmission line I/F block, supervisory control block, call processing block, SDM block and FLD block in that order from the far left hand side of the screen.

Therefore, the display image of each board also includes LEDs for indicating the state of a corresponding part, a maintenance connector for maintaining and debugging the corresponding part and a reset switch (RST_SW) as in the real board of the prior art. The state indicating ramp images such as ACT_LED, ALM_LED, ERR_LED and BLK_LED are displayed on the respective board image, wherein an ACT_LED lights up in case where the corresponding functional block normally operates without any trouble, an ALM_LED image lights up in case where an operation error occurs in the corresponding functional block, an ERR_LED image lights up in case where a communication error occurs between the corresponding functional block and another functional block, and a BLK_LED image lights up in case where the corresponding block is blocked.

If a functional block serving as a maintenance unit normally operates, the ACT_LED image of that functional block lights up. If an error occurs, e.g., in the baseband processing block 6, the ALM_LED image of the baseband processing block 6 lights up. The maintenance terminal 16 can make an alarm sound if necessary.

When the wireless processing part 5 abnormally operates, the board image thereof is not displayed, but instead the display screen of the maintenance terminal 16 displays which one is erroneous among the maintenance units of the AMP block, the LNA block and the modulation/demodulation block integrated into the wireless processing part 5. To display the display image on the basis of maintenance units, the maintenance information has to be detected from each maintenance unit and transmitted to the maintenance terminal 16 via the maintenance block 11.

The operator can immediately recognize where an error occurs by simply watching the display image shown in FIG. 4 and can take necessary steps to fix the problem in an expeditious manner. For instance, if the ALM_LED image of the AMP part shown in FIG. 4 lights up, the operator first clicks the RST_SW image of the AMP block on the display screen with, e.g., a mouse, and then the control software of the maintenance terminal 16 transmits a reset signal of the maintenance control information through the maintenance terminal antenna 15. The reset signal is received by the maintenance antenna 14 and is forwarded to the maintenance block 11. Next, the reset signal is transferred to the wireless processing block 5 via the control line 13 to drive a reset terminal of the AMP block of the wireless processing block 5 and reset the AMP block. If the fault is of a transient, the system may be simply recovered by the reset operation. Then the ALM_LED is turned off and the ACT_LED is turned on, representing the restoration of the AMP block into its normal state.

Also, by clicking a maintenance connector image of, e.g., the AMP block on the display screen and then selecting a direction menu for loading data to the AMP block, the gain level and output power level can be updated and blocking of the functional block can be executed on a basis of the maintenance unit. In case of the blocking, a block control signal is transmitted as the maintenance control information from the maintenance terminal 16 to the maintenance block 11. When a functional block is blocked, the maintenance information indicating the block state of the corresponding functional block is transmitted to the maintenance terminal 16 via the maintenance block 11 and the BLK_LED image of the corresponding functional block lights up.

Figure 5:
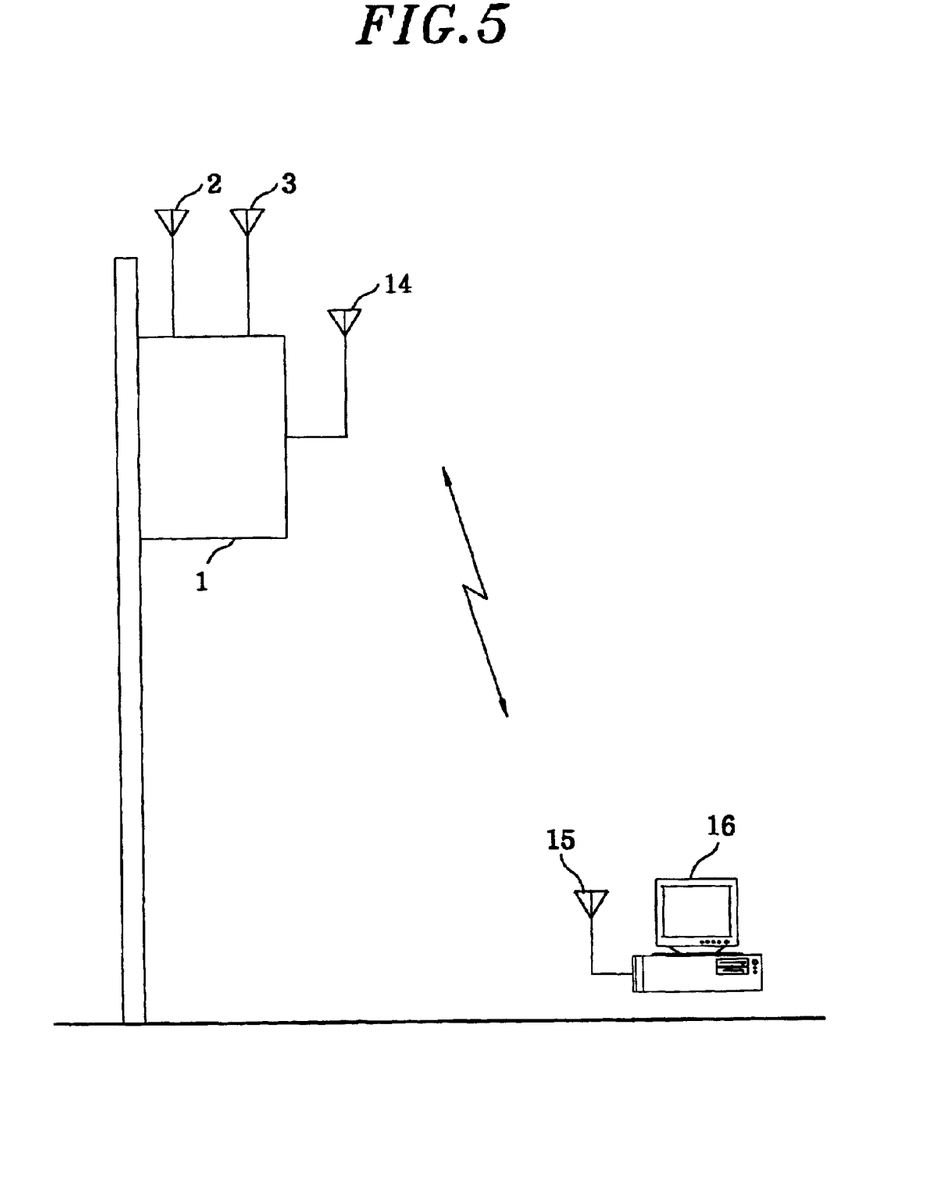
FIG. 5 illustrates an installation of a wireless base station.

As described above, the maintenance work in accordance with the present invention can be performed on the display screen of the remote maintenance terminal 16, without having to directly manipulate the boards in the housing body of the conventional wireless base station as shown in FIG. 3. Accordingly, the maintenance of a wireless base station can be performed without climbing up an electric pole, even when the wireless base station 1 is installed on the electric pole as shown in FIG. 5.

The maintenance of the wireless base station is performed not only to remove an error therein but also to routinely monitor the state of the wireless base station 1 by regularly obtaining data regarding, e.g., the communication quality, the reception level and the like. The state of a conventional wireless base station is checked by connecting a maintenance terminal to the maintenance connector of each board. On the other hand, in accordance with the present invention, the maintenance information representing the state of each functional block is provided to the maintenance terminal 16. The maintenance information thus provided can be modified to various forms in the maintenance terminal 16 and the modified data can be displayed in various forms on the display screen of the maintenance terminal 16.

Further, if the execution of a certain task is frequently carried out by a predetermined sequence of operations, the efficiency for performing the task can be significantly improved by programming the sequence to eliminate the need to manually repeat the same sequence every time to perform the task. For instance, the BER is generally measured by a series of operations of: receiving a predetermined pattern, comparing the predetermined pattern with a received pattern, and detecting bit errors based on the comparison result. Therefore, if the sequence of these operations is registered as a BER measurement item in the maintenance terminal 16, the operator can measure BER by simply selecting the item.

Also, by preparing and selecting a maintenance item for a communication quality, measurement data for reflecting the communication quality such as BER, signal to noise power ratio and the like can be carried out and displayed on the display screen of the maintenance terminal 16 by executing the control software of the maintenance terminal 16.

As stated above, the operator can obtain the desired data by simply running a measurement item specifying the sequence of operations stored in the control software, without executing the operations in the sequence one by one.

Also, by employing an internationally standardized operating system such as the Windows system supporting the majority of the languages currently used all over the world as an operating system of the control software, the wireless base station in accordance with the present invention can be globally adopted without changing the hardware.

While the present invention has been shown and described with respect to the preferred embodiments, it will be understood by those skilled in the art that various changes and modifications may be made without departing from the spirit and scope of the invention as defined in the following claims.

What is claimed is:

1. A wireless base station of a mobile wireless system, comprising:

a transmission antenna;

a reception antenna;

a maintenance antenna;

a wireless processing unit for modulating a signal to be transmitted via the transmission antenna and for demodulating a radio frequency signal received by the reception antenna; and a maintenance unit for collecting information on an internal state of the wireless base station as a maintenance information, transmitting the maintenance information through the maintenance antenna, and controlling an internal circuit of the wireless base station under a control of control information received through the maintenance antenna.

2. A method for maintaining the wireless base station of claim 1, comprising the step of:

preparing a maintenance terminal for communicating with the maintenance unit in the wireless base station through the maintenance antenna;

wherein the maintenance terminal receives the maintenance information transmitted from the maintenance unit and displays the maintenance information on a basis of a maintenance unit of internal circuit of the wireless base station.

3. A method for maintaining a wireless base station of claim 1, comprising the step of:

preparing a maintenance terminal for communicating with the maintenance unit in the wireless base station through the maintenance antenna;

wherein the maintenance terminal transmits the control information for maintaining the wireless base station.

4. The method of claim 3, wherein the maintenance terminal has a storage for storing the control information for performing a sequence of maintenance works to be carried out in the wireless base station, and sequentially reads the control information from the storage means and transmits the control information read to the maintenance unit to carry out the maintenance works in the wireless base station.

5. The method of claim 1, wherein the maintenance antenna is separated from the transmission and reception antennas to thereby transmit the maintenance information and receive the control information when there occurs a problem in the transmission antenna or the reception antenna.

6. The method of claim 2, wherein the maintenance antenna is separated from the transmission and reception antennas to thereby transmit the maintenance information and receive the control information when there occurs a problem in the transmission antenna or the reception antenna.

7. The method of claim 3, wherein the maintenance antenna is separated from the transmission and reception antennas to thereby transmit the maintenance information and receive the control information when there occurs a problem in the transmission antenna or the reception antenna.

8. The method of claim 4, wherein the maintenance antenna is separated from the transmission and reception antennas to thereby transmit the maintenance information and receive the control information when there occurs a problem in the transmission antenna or the reception antenna.

* * * * *